April 16, 1935.  J. W. HUME  1,997,825
WHEEL BALANCER
Filed Dec. 27, 1933

Inventor
James W. Hume
By [signature]
Attorney

Patented Apr. 16, 1935

1,997,825

UNITED STATES PATENT OFFICE 1,997,825

WHEEL BALANCER

James W. Hume, Jackson, Mich.

Application December 27, 1933, Serial No. 704,202

2 Claims. (Cl. 301—5)

The present invention relates to balance weights for attachment upon the tire retaining flange of a vehicle wheel to balance the unbalanced force which would otherwise result in objectionable vibration of the wheel upon rotation.

As in the case of my application, Ser. No. 704,201, filed Dec. 27, 1933, the present invention is a continuation-in-part of my application, Ser. No. 645,504, filed December 3, 1932, and has for its object to provide a balance weight having two longitudinally spaced lips which are engageable over the edge of the rim flange permitting the weight to be rigidly secured in position by a pair or even a single set screw.

Figure 1:
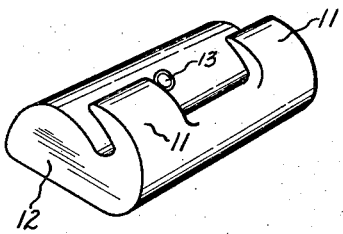
Figure 6:
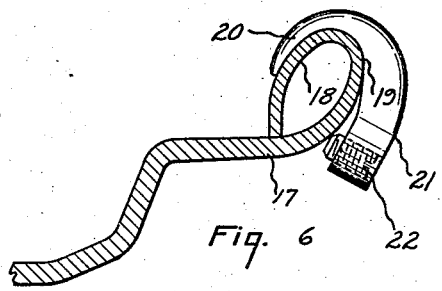
Figure 2:
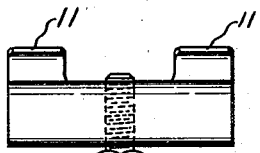
Figure 3:
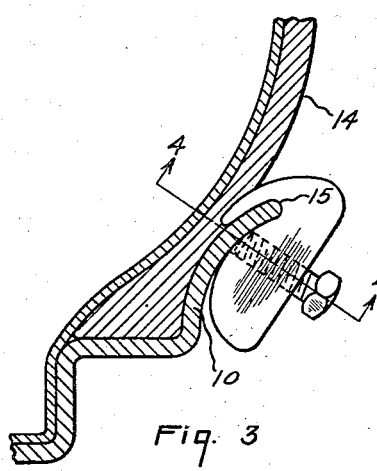
Figure 5:
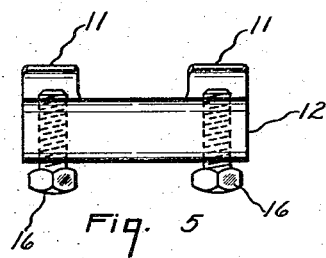
Figure 4:
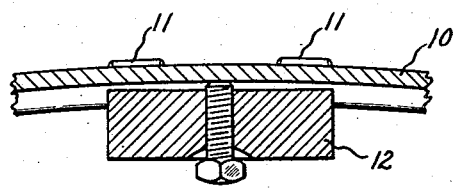

Other objects and advantages of the invention will become apparent in the description to follow taken in connection with the accompanying drawing in which, Fig. 1 is a perspective view of my improved balance weight, Fig. 2 is a front elevation with the set screw in position, Fig. 3 is a fragmentary cross-sectional view through a tire and rim of a vehicle wheel showing the balance weight in position, Fig. 4 is a cross-sectional view of the balance weight and rim section taken on line 4—4 of Fig. 3, Fig. 5 is a view similar to Fig. 2 of a modified form, and Fig. 6 is a view of a still further modification attached to a different form of rim flange.

As in the aforesaid co-pending applications, my improved balance weight is particularly adapted to be attached along the rim flange of the tire and wheel assembly. Because of the high speed at which the wheel assembly is rotated, vibration and shock from the road, and chance blows, the balance weight may receive during operation, it is essential that the same be firmly secured in position. As shown in Fig. 4, the flange 10 of the rim is curvilinear, the degree of which changes with the various size wheels. Obviously it is practical to have a standard balance weight attachable upon rims of wheels varying widely in diameter and degree of curvilinearity. Also it is more convenient and economical to cast the weight in straight bar with plane surfaces. For this reason the balance weight as designed do not confirm sufficiently to the contour of the rim flange to prevent rocking unless provision is made to avoid such action.

According to the present invention longitudinally spaced lips 11 overhang and are preferably integrally associated with an elongated heavy body 12. The lips 11 are sufficiently spaced from the body 12 to receive the edge of the flange 10 therebetween. In the embodiment shown in Figs. 1 and 2 a set screw 13 or equivalent clamping means is adjustably threaded in the body 12 centrally thereof and between the lips 11. The balance weights are preferably cast from a nonferrous metal such as brass to prevent corrosion. To avoid objectionable deflection of the side wall of the tire 14 when the flare of the flange 10 and length of the lips 11 result in the latter occupying space normally occupied by the side wall, the lips 11 are made relatively thin. For this reason and because of the malleability of the material from which the weight is cast, upon tightening of the set screw 13, to clamp the weight upon the flange 10 with a rigid three point engagement, the lips 11 will be slightly distorted to conform substantially to the contour of the inner side of the flange as best shown in Fig. 4. Such construction reduces the deflection of the tire wall to a minimum. It is to be apparent that by providing a two point bearing along the edge 15 between the same and the lips 11, the weight can not be rocked upon the edge 15. Moreover, by clamping the weight upon the flange with a three point engagement, a rigid attachment will result regardless of the curvilinearity of the flange itself.

The modification shown in Fig. 5 may be identical with the weight shown in Figs. 1 and 2 with the exception that two set screws 16 are provided in the transverse plane of the lips 11. This arrangement likewise makes it possible to rigidly clamp the balance weight upon rim flanges of varying curvilinearity.

In Fig. 6 my invention is shown adapted to a modified type of rim section in which flange 17 is inwardly rolled as at 18. When used upon such a rim section, it is necessary to greatly increase the width of the throat 19 defined between the lip 20 and body 21, the throat conforming substantially to the cross sectional contour of the rolled flange. The balance weight shown in Fig. 6 may have only a single lip as disclosed in my co-pending applications or it may be provided with two longitudinally spaced lips and provided with one or more set screws 22 in a manner similar to the modification shown in Figs. 1 to 5, inclusive, as should be readily understood.

In conclusion it is to be appreciated that the embodiment of the invention herein described in detail is merely illustrative and that it is not my intention to be limited to any specific construction other than to the extent set forth in the appended claims.

I claim:

1. A balance weight attachable to a tire retaining flange of a vehicle wheel assembly comprising a heavy body portion and a pair of longitudinally spaced overhanging lip portions, said lips and body portion being sufficiently spaced to receive therebetween an edge portion of said flange, adjustable clamping means for clamping said lips against one side of said flange, said means engaging said flange between said lips and on the opposite side thereof.

2. A balance weight attachable to a tire retaining flange of a vehicle wheel assembly comprising a heavy body portion and a pair of longitudinally spaced overhanging lip portions, said lips and body portion being sufficiently spaced to receive therebetween an edge portion of said flange, adjustable clamping means for clamping said lips against one side of said flange, said means engaging said flange on the opposite side thereof.

JAMES W. HUME.